(12) United States Patent

Aliramaei

(10) Patent No.: US 12,696,849 B2

(45) Date of Patent: Aug. 4, 2026

(54) TECHNOLOGY FOR CULTIVATION OF PLANTS

(71) Applicant: ELENOVATIONS AS, Stavanger (NO)

(72) Inventor: Rozalin Aliramaei, Stavanger (NO)

(73) Assignee: Elenovations AS, Stavanger (NO)

( * ) Notice: Subject to any disclaimer, the term of this patent is extended or adjusted under 35 U.S.C. 154(b) by 0 days.

(21) Appl. No.: 18/561,995

(22) PCT Filed: May 17, 2022

(86) PCT No.: PCT/EP2022/063302

§ 371 (c)(1),
(2) Date: Nov. 17, 2023

(87) PCT Pub. No.: WO2022/243301

PCT Pub. Date: Nov. 24, 2022

(65) Prior Publication Data

US 2024/0237586 A1 Jul. 18, 2024

(30) Foreign Application Priority Data

May 19, 2021 (SE) .................................... 2150639-9
May 3, 2022 (SE) .................................... 2250541-6

(51) Int. Cl.
A01G 7/04 (2006.01)
H01F 7/02 (2006.01)
A01G 22/35 (2018.01)

(52) U.S. Cl.
CPC ............. A01G 7/04 (2013.01); H01F 7/0205 (2013.01); A01G 22/35 (2018.02)

(58) Field of Classification Search
CPC ....................................................... A01G 7/04
See application file for complete search history.

(56) References Cited

U.S. PATENT DOCUMENTS 5,077,934 A * 1/1992 Liboff ...................... A01G 7/04
47/1.3
5,097,625 A * 3/1992 Kaneko .................. A01C 1/044
47/DIG. 9

(Continued)

FOREIGN PATENT DOCUMENTS

CN 203302110 U 11/2013
CN 106305104 A 1/2017

(Continued)

OTHER PUBLICATIONS

Massimo E. Maffei, "Magnetic Field Effects on Plant Growth, Development, and Evolution", Frontiers in Plant Science Plant Physiology: Sep. 2014, 15 Pages, vol. 5, Article 445.

*Primary Examiner* — Monica L Perry

(74) *Attorney, Agent, or Firm* — Shore IP Group, PLLC; Howard J. Klein

(57) ABSTRACT

The proposed technology relates to a plant cultivation assembly (100) and to a method of cultivating a plant (107). The plant cultivation assembly (100) comprises a growth medium support (101), a growth position (108) within the growth medium support (101), and a magnet (103). A magnetic field is generated by the magnet at the growth medium support, the generated magnetic field is inclined with respect to a horizontal plane (102).

10 Claims, 12 Drawing Sheets

(56)        References Cited

U.S. PATENT DOCUMENTS

| | | | | |
|---|---|---|---|---|
| 6,539,664 | B2 * | 4/2003 | Katsen | A01G 7/04 |
| | | | | 47/1.3 |
| 8,667,732 | B2 * | 3/2014 | Gleim | A01C 1/02 |
| | | | | 47/1.3 |
| 2005/0182287 | A1 * | 8/2005 | Becker | A61N 2/008 |
| | | | | 336/122 |
| 2016/0044873 | A1 * | 2/2016 | Jin | A01G 7/04 |
| | | | | 47/1.3 |

FOREIGN PATENT DOCUMENTS

| | | | | | |
|---|---|---|---|---|---|
| CN | 210247621 | U | 4/2020 | | |
| CN | 2504891 | Y | 8/2022 | | |
| EP | 0 039 163 | A1 | 11/1981 | | |
| EP | 0 459 540 | A1 | 12/1991 | | |
| JP | 2005335722 | A | 12/2005 | | |
| JP | 2013243993 | A | 12/2013 | | |
| KR | 2010 0002879 | A | 1/2010 | | |
| KR | 20120096170 | A | 8/2012 | | |
| RU | 2629263 | C2 * | 8/2017 | | A01G 7/04 |
| WO | 01/05214 | A1 | 1/2001 | | |
| WO | 2021/030161 | A1 | 2/2021 | | |

* cited by examiner (1)                    (2)

*a)*

*b)*

*c)*

*d)*

*a)*

*b)*

TECHNOLOGY FOR CULTIVATION OF PLANTS

CROSS-REFERENCE TO RELATED APPLICATIONS

This application is a national phase entry, under 35 U.S.C. 371, of International Application No. PCT/EP2022/063302, filed May 17, 2022, the disclosure of which is incorporated herein by reference in its entirety. International Application No. PCT/EP2022/063302 claims priority from Swedish Application Nos. 2150639-9 and 2250541-6, filed May 19, 2021 and May 3, 2022, respectively.

TECHNICAL FIELD

The proposed technology relates generally to the field of cultivation of plants. The technology specifically relates to an assembly and a method for cultivation of plants.

BACKGROUND

The Earth's magnetic field (MF) is an environmental factor that is present in all ecosystems. It is known to influence many biological processes. The MF varies between different locations around the globe.

In the 1960's came the first reports about the influence of the Earth's magnetic field on plants. It is well documented that magnetic fields can be used to influence plant growth cycles. For example, plants can be stimulated to increase the quantity and quality of yields.

M. E. Maffei "Magnetic field effect on plant growth, development, and evolution" in Frontiers in Plant Science, September 2014, vol 5, article 445, describes that the geomagnetic field is a natural component of our environment. The scientific paper concludes that plants receive and respond quickly to varying MF by altering their gene expression and phenotype.

U.S. Pat. No. 8,667,732 B2 discloses a method for the treatment of plants using electromagnetic fields. The method consists in applying pulse sequences to growing plants or seeds in a pulsed electromagnetic field by means of a pulse generator.

OBJECT

The proposed technology aims at improving the growth rate of plants and/or quality of plants. The proposed technology additionally aims at possible preserving and reducing the growth rate.

SUMMARY

According to the proposed technology, at least the primary object is attained by means of the plant cultivation assembly having the features defined in the independent claims as well as of the method of cultivating a plant specified in the claims. Preferred embodiments of the proposed technology are further defined in the dependent claims.

According to a first aspect of the proposed technology, a plant cultivation assembly is provided that comprises: a growth medium support configured to be supported on, or relative to, a horizontal surface, or horizontal plane, wherein the growth medium support comprises a lower half and an upper half and comprises, or defines, a growth position within the growth medium support. The growth position may be arranged in the upper half of the growth medium support and at the centre, or at the transverse or radial center, of the growth medium support. The assembly further comprises: a magnet configured to generate a magnetic field at the growth position in the growth medium support that is inclined with respect to a horizontal plane.

It is understood that the growth position is a position, or location, or place, within the growth medium support. During use of a plant assembly a plant is arranged at the growth position, meaning that at least part of the plants is arranged at the growth position. For example, a stem of a plant may start from the growth position, or a seed may be positioned at the growth position.

The plant cultivation assembly may comprise a growth medium, the term 'growth medium' is to be understood as a medium that supports a plant, such as perlite in hydroponics. The growth medium may further provide nutrients to the plant, such as soil. The growth medium may be supported by the growth medium support. For example, the growth medium support may be a pot. The growth medium support may be of a non-magnetic material, such as a plastic or ceramic material. The non-magnetic material may be dia-magnetic material. The non-magnetic material is understood to be a non-paramagnetic or non-ferromagnetic material. It should further be pointed out that the growth medium support could have any shape that allows for supporting a growth medium, such a cylinder, a box, etc.

The term 'growth medium support' is to be understood to encompass pots, trays, and cultivation boxes that are readily available for plant cultivation. The term 'pot' used in the description and in the claims is to be understood as a device that is readily available for cultivation of plants.

It shall also be pointed out that although the term 'plant' is to be regarded as a general term. It shall be realized that it is to be understood to encompass embryonic plants, callus, seeds, sprouts, buds, bulbs, seedlings, rooted plants, and plant cuttings/shoots. The plant can for example be an amaryllis in any stage, or a tomatillo plant.

The plant cultivation assembly may comprise a plant positioned at the growth position, the plant being supported by the growth medium.

The magnet may be an electromagnet. The electromagnet comprises at least one electrical contact configured to connect the electromagnet to a power supply. The power supply may form part of the plant cultivation assembly. The plant cultivation assembly may further comprise a control unit configured to control the magnetic field generated by the electromagnet. The control unit may comprise the power supply.

The term 'electromagnet' is to be understood as a magnet in which the magnetic field is produced, or generated, by an electric current. The electric current is a direct current. The direct current produces a static magnetic field. The electromagnet can be a coil, or a solenoid. The electromagnet can be a wire, or a combination of wires. The term 'coil' is to be understood to encompass an electrical conductor, such as a solid conductor or wire, wound to form a ring-like, or annular, shape. The term 'solenoid' is understood to encompass an electrical conductor wound to form a spiral or helix.

The coil may be arranged under, above, or at least partly surrounding the growth medium support. The coil may be parallel with the horizontal surface, or configured to extend radially in parallel with the horizontal surface. Alternatively, the coil may be slanted relative to the horizontal surface, or configured to extend radially at an angle to the horizontal surface.

The solenoid may partly surround the growth medium support. The solenoid may be aligned with the normal of the horizontal surface, or may extend longitudinally at a right angle to the horizontal surface. The solenoid may be slanted relative to the normal of the horizontal surface, or may extend longitudinally at an angle to the horizontal surface.

The largest diameter of the electromagnet may be 90-100% of the largest diameter, or maximum transverse, or radial, or extent, of the growth medium support. The coil may have diameter that is smaller than the transverse, or radial, extent of the growth medium support. The solenoid may have diameter that is greater than the transverse, or radial, extent of the growth medium support.

The magnet may be a permanent magnet. The term 'permanent magnet' is to be understood as a material, or object, that produces a permanent magnetic field. It can for example be a paramagnetic or ferromagnetic material or object.

The magnetic field may be static. The term 'static' is to be understood as essentially constant, i.e. a small variation such as a 10% variation in the intensity and/or inclination of the magnet field or less. The term 'static magnetic field' is to be understood as that the intensity and direction of the magnetic field does not vary, or that the variation in intensity and/or direction is less than 10%. For an electromagnet, this requires a constant electric current. Here, the "intensity of the magnetic field" is understood to be interchangeable with "magnetic field strength".

According to a second aspect of the proposed technology there is a method of cultivating a plant at a specific geographical location, or site. The method comprises determining, or measuring, or obtaining, a target magnetic field having a target inclination value, determining, or measuring, or obtaining, an in-situ magnetic field at the specific geographical location, and determining, or measuring, or obtaining, a compensating magnetic field based on the difference between the target magnetic field and the in-situ magnetic field. The method further comprises generating the compensating magnetic field at the plant, or subjecting the plant to the compensating magnetic field. Determining, or measuring, or obtaining, a target magnetic field may comprise determining, or measuring, or obtaining, seasonal based changes, or variations, or fluctuations, in the magnetic field at the specific geographical location, or site. It may further comprise synchronizing the seasonal based changes in the magnetic field with daylight variations. Daylight variations may be controlled by lighting and/or by the applied magnetic field. Hence, daylight variations can be artificially generated by lighting and synchronized with seasonal based changes of a magnetic field.

The geomagnetic intensity and inclination value vary in different locations on earth based on the latitude and longitude. The changes in the inclination occur during seasonal changes in the horizontal and/or vertical magnetic field of the earth. The magnitudes of the intensity and the inclination value are variables dependent on the position of the Earth against the Sun, and Sun magnetic activities. This position changes along the year as the distance and the position of northern and southern hemispheres changes against the Sun. The magnetic field magnitude varies in both horizontal and vertical directions, or gets stronger or weaker, along the day/night position of the geographic location.

The pattern of the changes in the magnitudes of the intensity and inclination value repeats every year for each geographic location. This means that the pattern is approximately the same every year. Therefore, an approximate pattern may be predicted based on information regarding previous years.

Determining, or measuring, or obtaining, a target magnetic field having a target inclination value is understood as obtaining the desired data. Obtaining the desired data may be performed directly, such as by measurements, or indirectly, such as by extracting the data from a database. For example, the field at the location, or the target field, may be measured by a magnetometer to extract, or obtain, the specific field at the location. Preferably, the measurement is performed constantly. The target magnetic field may be measured by the closest geomagnetic observatory to the location. The measurements may be entered into a database of a global observatory. The desired data may be obtained from the database.

Obtaining data, or pattern, from the geomagnetic observatory may be performed by extracting these data from databases provided by global observatories. For example, the recorded magnetic data for a day/night or for an entire year data may be obtained from the intermagnet website:

https://www.intermagnet.org/index-eng.php

Thus, the expression 'obtaining a target magnetic field having a target inclination value' may encompass obtaining the necessary, or desired, data from the database. The similar approach applies to the term 'obtaining an in-situ magnetic field at the specific geographical location'. The in-situ magnetic field may be measured by a magnetometer. The in-situ magnetic field may, for example, be measured by the closest geomagnetic observatory to that location and the data may be extracted from the corresponding database.

The term 'inclination value' is to be understood as an inclination in relation to a horizontal plane. The term 'in-situ magnetic field' is to be understood as the magnetic field at the geographical location for cultivating a plant. The term 'target magnetic field' is to be understood as the magnetic field at the geographical region, or site, of origin of the plant. The target magnetic field typically varies during the year depending on the season. The changes of the target magnetic field are applied to the plant by the 'compensating magnetic field'. The term 'compensating magnetic field' is to be understood as the magnetic field that is to be applied to the plant. The compensating magnetic field is based on the difference between the target magnetic field and the in-situ magnetic field. The target magnetic field may have a target intensity value, the in-situ magnetic field may have an in-situ intensity value, and the compensating magnetic field may have a calculated intensity value. It should be noted that the compensating magnetic field does not have to be an exact replicate of the target magnetic field. The changes of the target magnetic field (due to for example seasonal variation) should be replicated by the compensating magnetic field.

The plant may have a natural growing season, or cycle, and originate from a geographic region, or site, having seasonal variations in the geomagnetic field. The plant may be in a specific development stage, and determining, or measuring, or obtaining, the target magnetic field may be based on the development stage of the plant, the natural growing season, and the seasonal variations in the geomagnetic field. Thus, a special stage of growth, or development, of the plant may be targeted by resembling the seasonal variations in the geomagnetic field. The variations may occur in vertical and/or horizontal direction in a specific season. The geomagnetic field may vary in intensity. The geomagnetic field may vary in direction, or inclination. The plant can sense the variations. This activates vital signals for plant hormones to start or stop a specific stage development of the plant.

The plant may be a seed, and the specific development stage germination, or the plant may be a sprout, and the specific development stage seedling, or the plant may be a bulb, and the specific development stage vegetative stage.

The proposed technology may be used for triggering and/or accelerating the sprouting of a plant. The plant may be a potato. The plant may be a tomato seed. The method may be performed in a storage environment before planting the plant in the soil. Conventionally, the process comprises applying UV light, sunlight, or heating and humidity treatments. The advantage of the proposed technology is that the germination time may be reduced. The treatment of the plant may be started in the storage facility. The loss of sprouts may thereby be reduced. The potato sprouts quality may be increased. Accordingly, the yield may be increased. Additionally, the process becomes more time and cost efficient due to the absence or less need of the above-described additional treatments.

The compensating magnetic field may be applied during germination, seedling, dormancy and bud stage. It could also be applied during flowering and/or fruiting stage. The compensating magnetic field may be applied during one or several of the above-mentioned stages. For example, it could be applied to inhibit a sprouting potato. The compensating magnetic field may be applied to preserve the potato for longer storage time. This means that the field that triggers the sprouting may be cancelled. It is understood that the cancellation of the field is provided by applying a desired compensation field to the potato. For example, the field that the potato receives from earth during sprouting season may be cancelled. This may be achieved by applying a compensation field that is opposite to the field to be cancelled. Thereby, the potato is prevented from sprouting. In other words, the potato is kept preserved in the dormancy mode, or stage, in the storage. This is possible due to the relationship between the applied field and the potato hormones. It is understood that the potato is an illustrative example, and that other plants may be treated in a corresponding way.

The proposed technology provides for preserving a plant or for inhibiting its growth. Additionally or alternatively, the plants may be manipulated to shift the seasons and/or stay in one stage for a longer or shorter period of time. In other words, the plants may be manipulated to experience a modified season and/or amend the period of a development stage.

The proposed technology may be used for accelerating a ripening process. This may be achieved during transportation and/or storage period. For example, the proposed technology may be used on fungi. Another example is use of the proposed technology for ripening and/or preserving of berries such as strawberries. The seeds of the fruit or a berry, such as strawberry are a part of the lifecycle and actively regulating hormones on the fruit, if they are attached to the fruit. It means that the seeds may control the sweetness, ripening, and/or rotting of the fruit even after being picked from the plant.

Further advantages with and features of the proposed technology will be apparent from the other dependent claims as well as from the following detailed description of preferred embodiments.

BRIEF DESCRIPTION OF THE DRAWINGS

A more complete understanding of the abovementioned and other features and advantages of the proposed technology will be apparent from the following detailed description of embodiments of the proposed technology in conjunction with the appended drawings, wherein.

DESCRIPTION OF THE FIGURES

Figure 1:
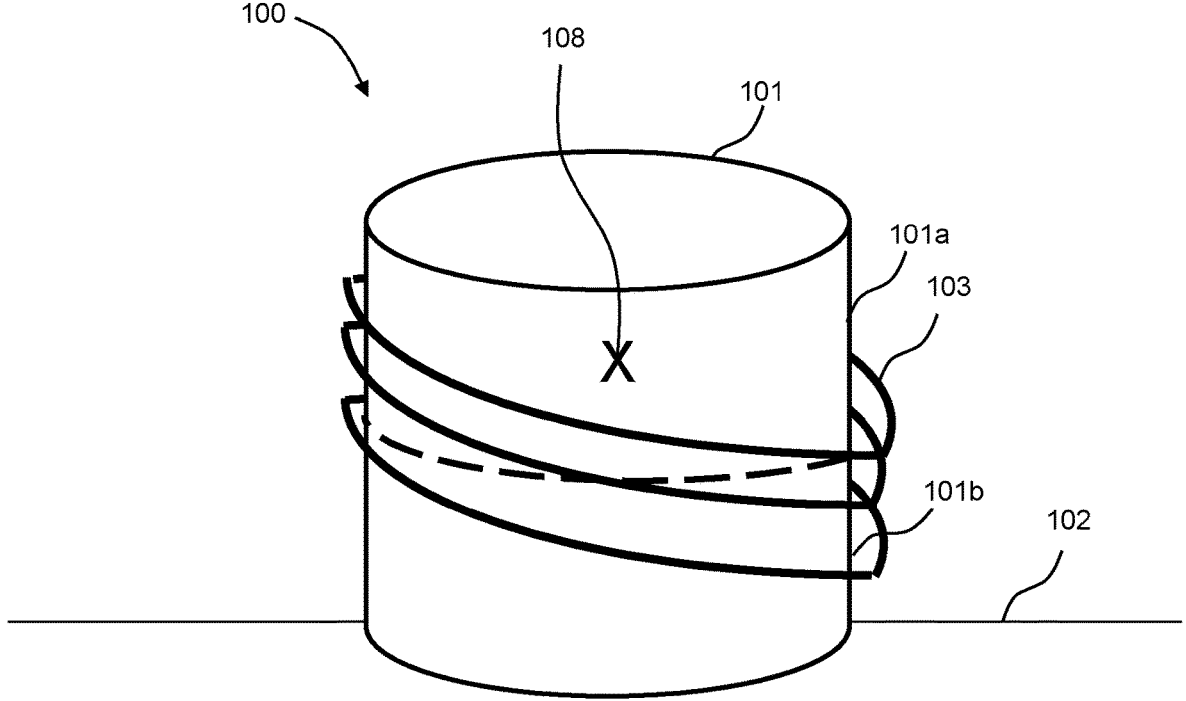
FIG. 1 is a schematic view of a plant cultivation assembly.

FIG. 1 shows a schematic illustration of a plant cultivation assembly 100 comprising a growth medium support 101. The growth medium support 101 illustrated in FIG. 1 is a pot having the form of a cylinder. It is closed at the bottom and provided with drainage holes. There is a growth position 108 marked X inside the upper half and at the radial center of the growth medium support 101. The growth medium support 101 is arranged on a plane and horizontal surface 102. An electromagnet 103 in the form of a solenoid tilted with respect to the surface 102 is arranged so that it surrounds part of the growth medium support 101. The electromagnet 103 is connected to a control unit (not shown) as in the embodiment described in relation to FIG. 5.

Figure 2:
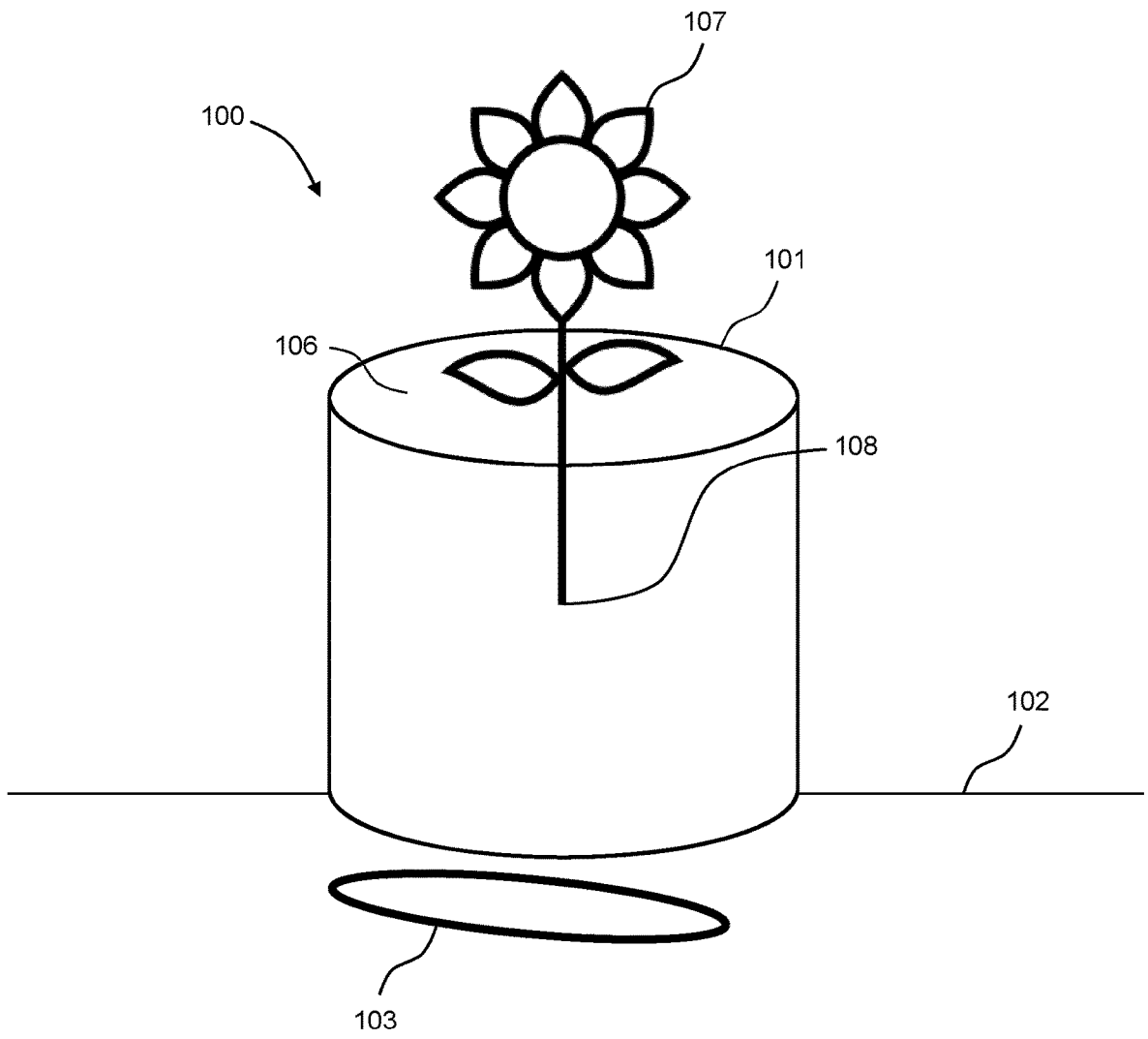
FIG. 2 is a schematic view of a plant cultivation assembly.

FIG. 2 shows a schematic illustration of a plant cultivation assembly 100 comprising a growth medium support 101. The growth medium support 101 illustrated in FIG. 2 has the form of a cylinder. The growth medium support 101 is arranged on a substantially plane/horizontal surface 102. A magnet 103 is arranged underneath the growth medium support 101. The magnet 103 is a permanent magnet. The plant cultivation assembly illustrated in FIG. 2 further comprises a growth medium 106 and a plant 107, both arranged in the growth medium support 101. The plant 107 is positioned at a growth position 108.

Figure 3:
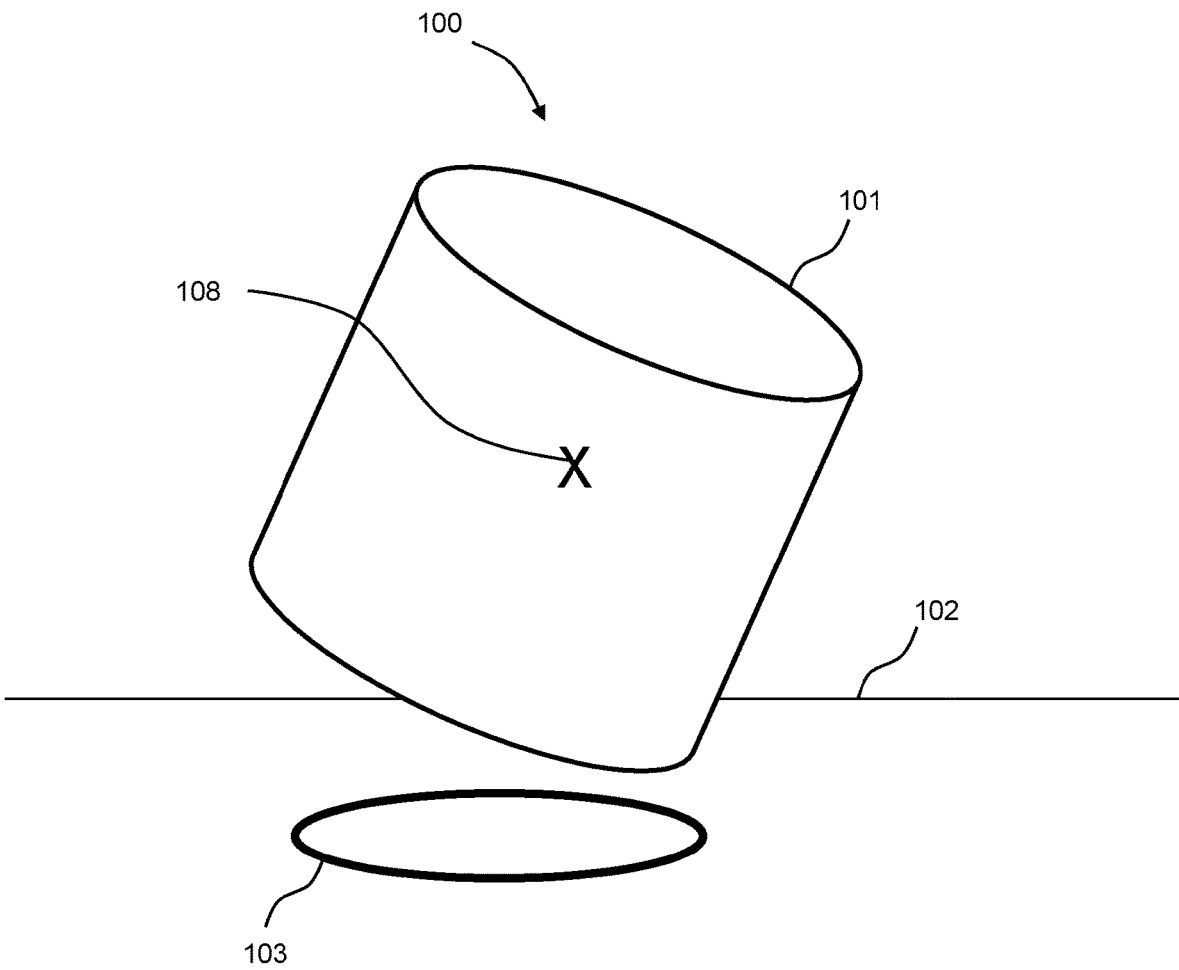
FIG. 3 is a schematic view of a plant cultivation assembly.

FIG. 3 shows a schematic illustration of a plant cultivation assembly 100 comprising a growth medium support 101. The growth medium support 101 illustrated in FIG. 3 has the form of a cylinder. The growth medium support 101 is arranged with an angle towards a substantially plane/horizontal surface 102. A magnet 103 is arranged underneath the growth medium support 101. The magnet 103 is a permanent magnet. There is a growth position 108 marked X inside the upper half of the growth medium support 101.

Figure 4:
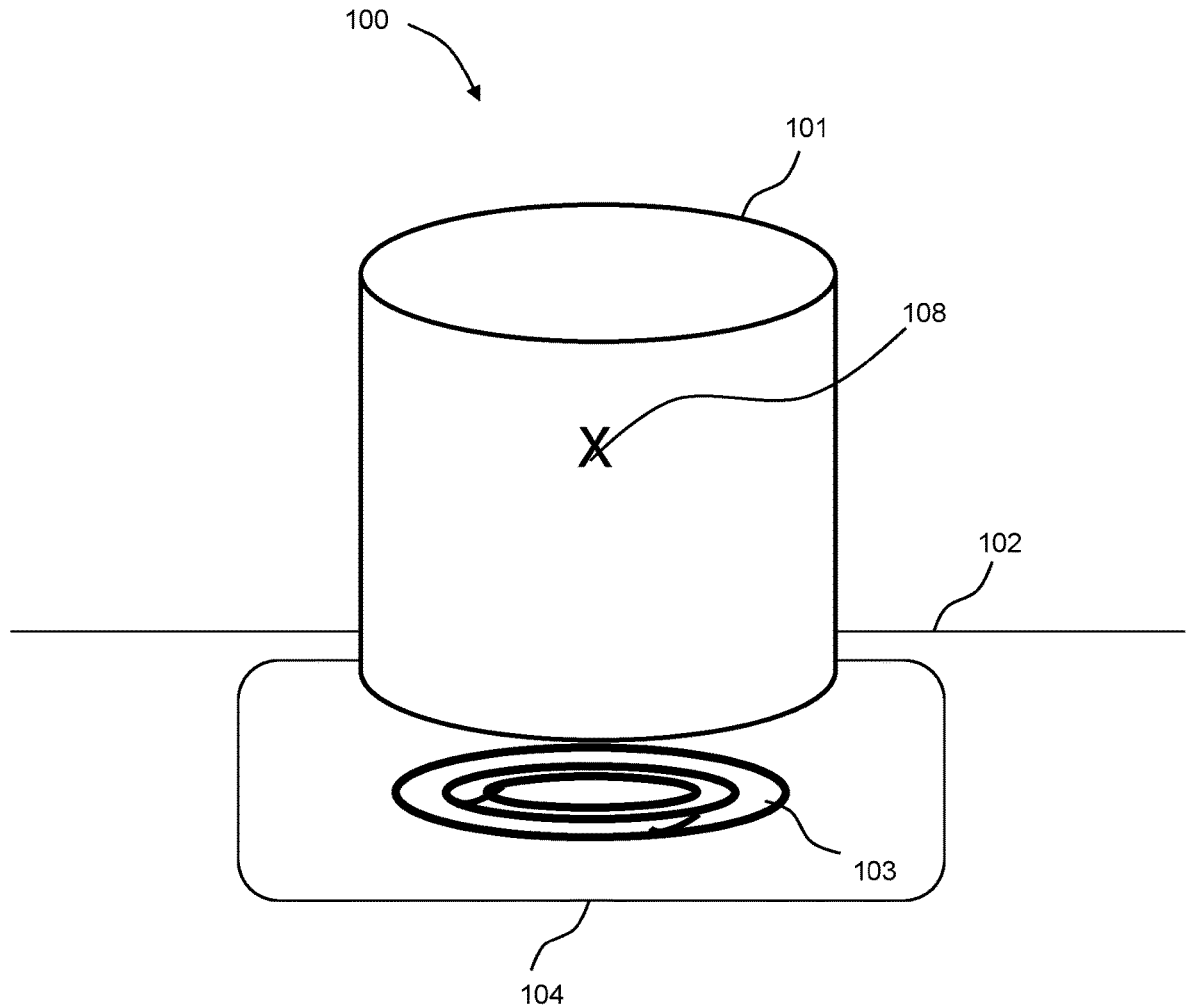
FIG. 4 is a schematic view of a plant cultivation assembly.

FIG. 4 shows a schematic illustration of a plant cultivation assembly 100 comprising a growth medium support 101. The growth medium support 101 illustrated in FIG. 4 has the form of a cylinder. The growth medium support 101 is arranged on a substantially plane/horizontal surface 102. The growth medium support 101 is arranged on a mat 104. The mat 104 has an electromagnet 103 in the form of a coil connected to a control unit (not shown) as in the embodiment described in relation to FIG. 5. The electromagnet 103 is positioned within the mat and the growth medium support 101 is centered on the coil. There is a growth position 108 marked X inside the upper half of the growth medium support 101.

Figure 5:
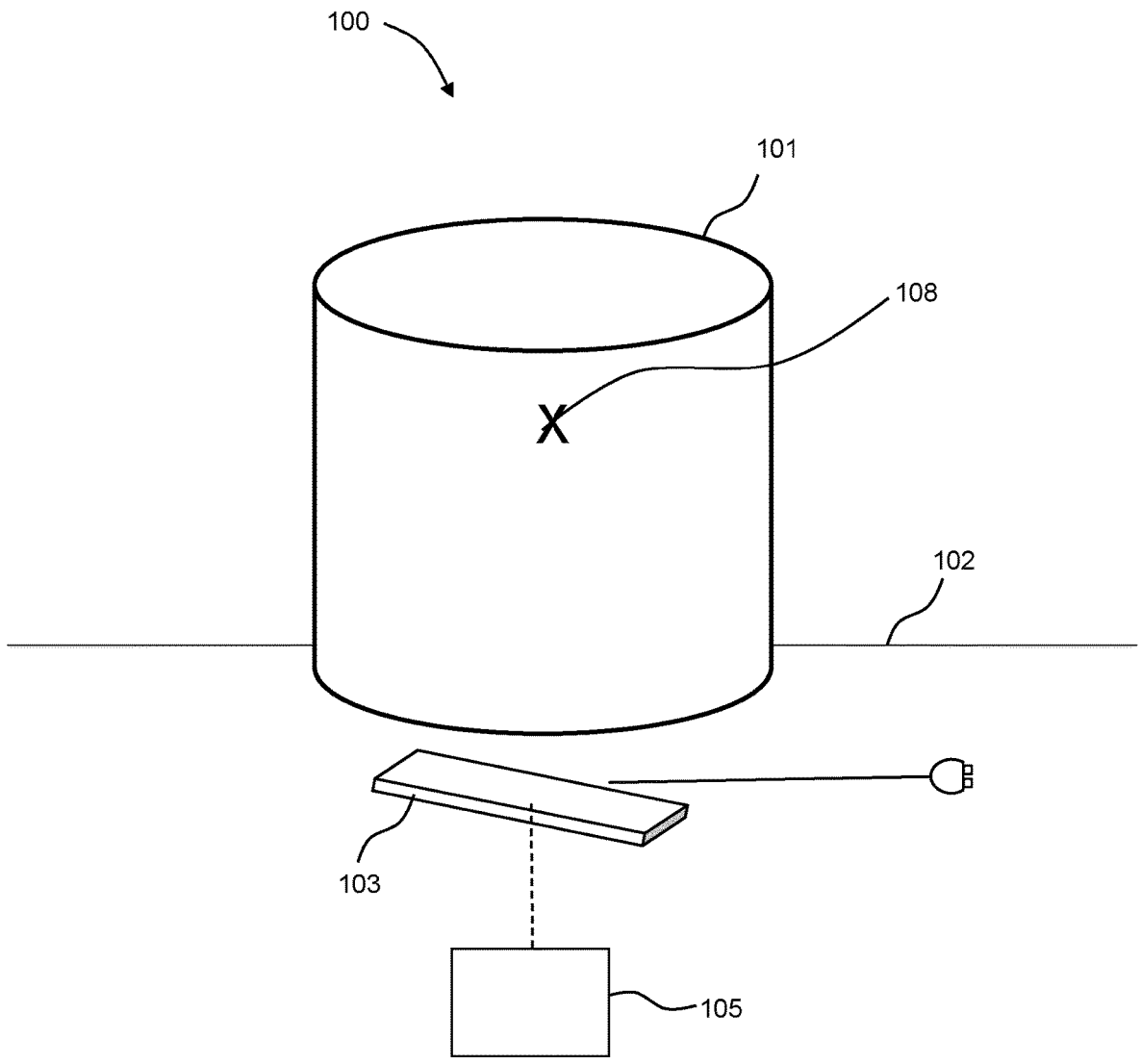
FIG. 5 is a schematic view of a plant cultivation assembly.

FIG. 5 shows a schematic illustration of a plant cultivation assembly 100 comprising a growth medium support 101. The growth medium support 101 illustrated in FIG. 5 has the form of a cylinder. The growth medium support 101 is arranged on a substantially plane/horizontal surface 102. A magnet 103 in the form of an electromagnet is arranged underneath the growth medium support 101. The electromagnet 103 is connected to a power supply (not shown) and in communicative communication with a processor 105. There is a growth position 108 marked X inside the upper half of the growth medium support 101.

Figure 6:
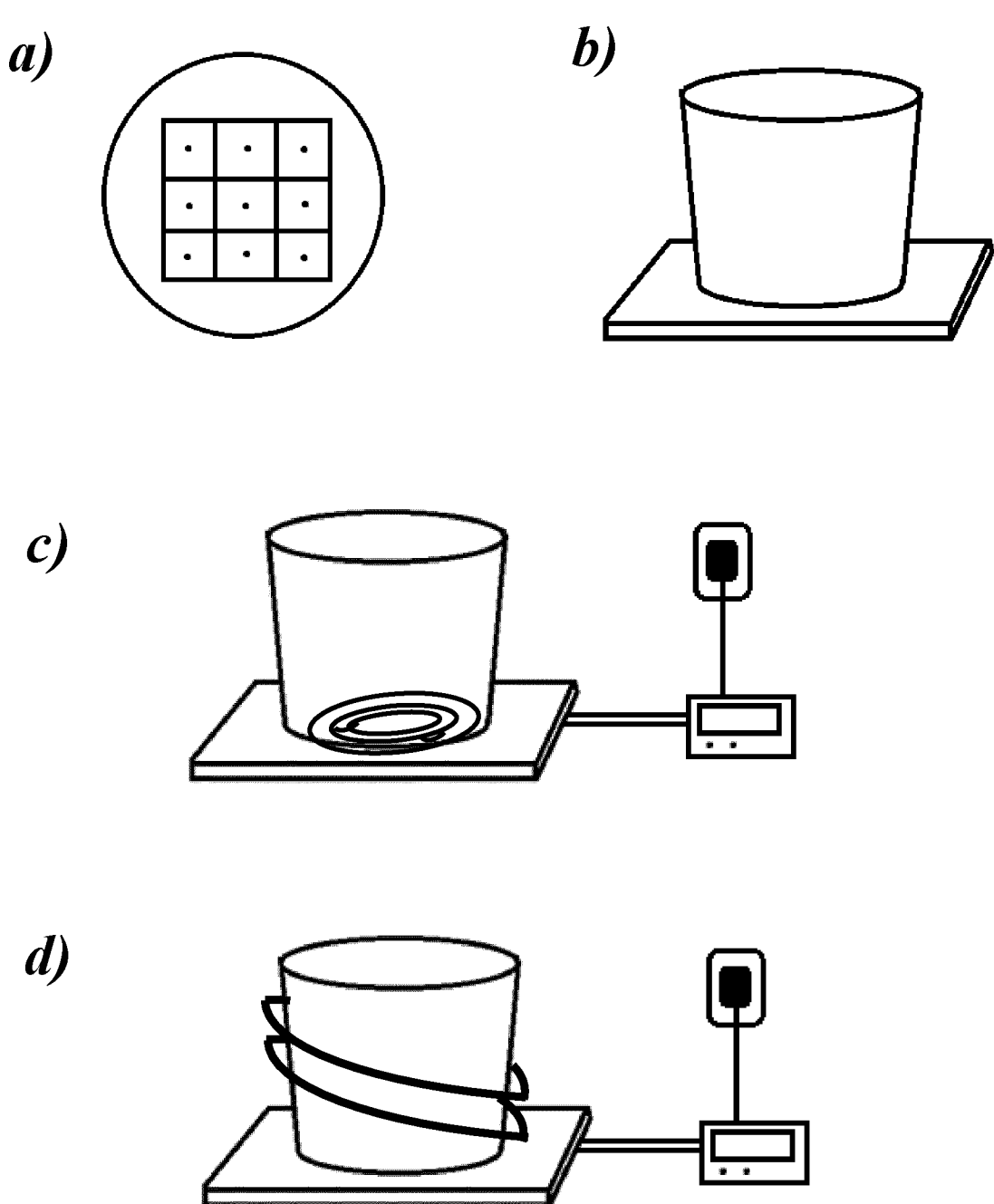
FIG. 6 *a-d* are schematic illustration of an experimental set-up.

FIGS. 6 *a-d* are schematic illustrations of an experimental set-up. FIG. 6*a* shows a set-up for a group of seed pots. FIG. 6*b* shows a setting for a control group. FIGS. 6*c* and *d* shows a plant cultivation assembly that is investigated. Two types were used, one with a coil illustrated in FIG. 6*c* and one with a solenoid illustrated in FIG. 6*d*.

Figure 7:
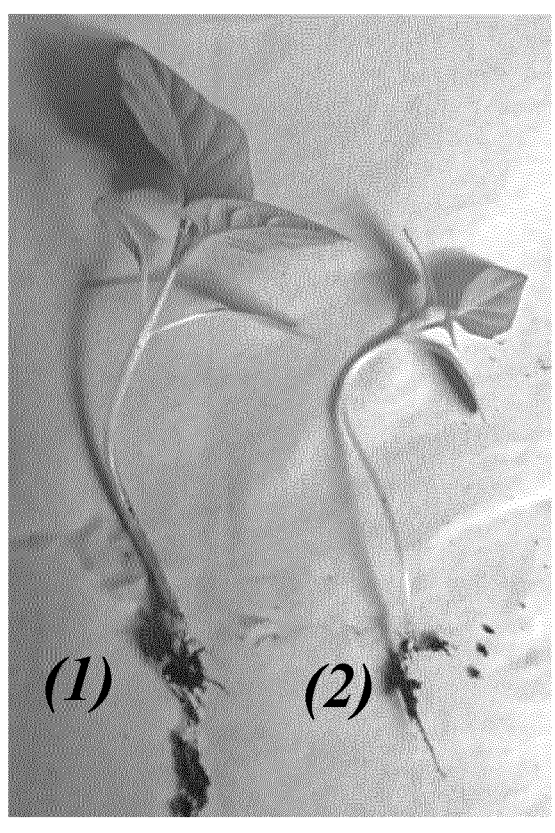
FIG. 7 is a photograph from an example of the proposed technology.

FIG. 7 is a photograph showing a plant (1) subjected to a treatment according to the proposed technology compared with a plant (2) not subjected to a treatment, i.e. a control plant.

Figure 8:
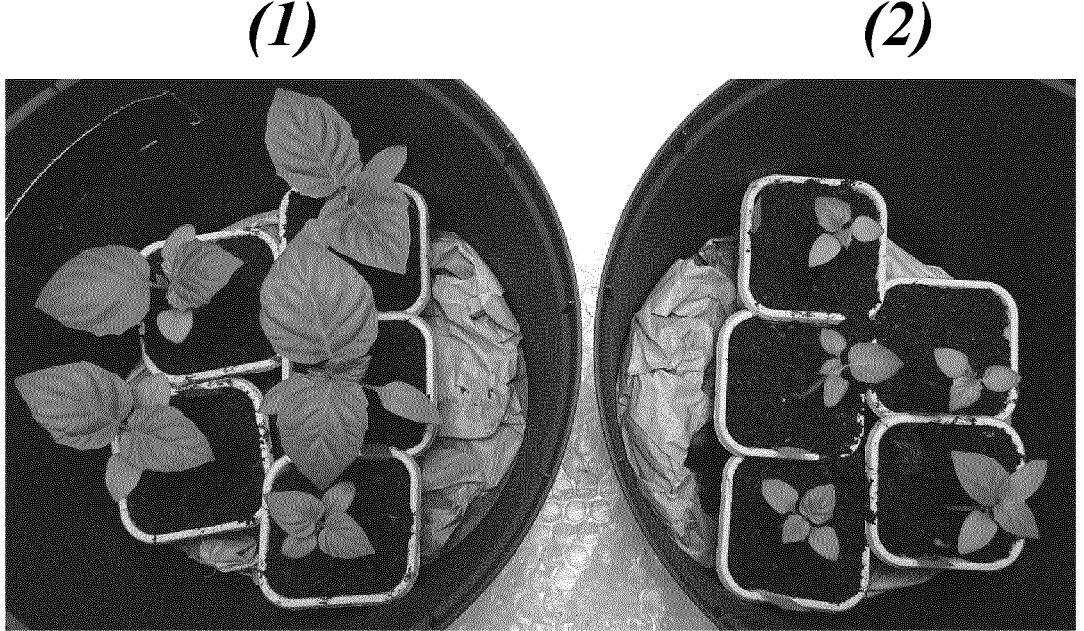
FIG. 8 is a photograph from an example of the proposed technology.

FIG. 8 is a photograph showing plants (1) subjected to a treatment according to the proposed technology compared with plants (2) not subjected to a treatment, i.e. control plants.

Figure 9:
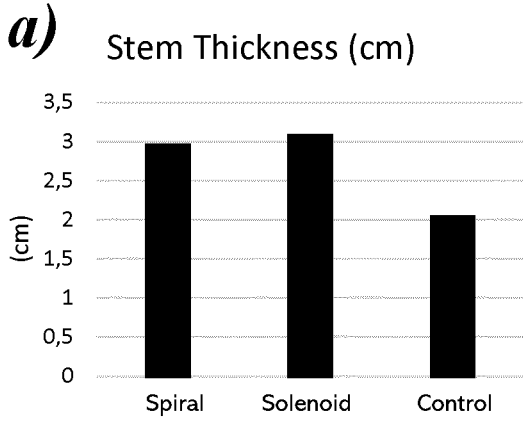
FIGS. 9 *a-d* are graphs from an example of the proposed technology.
Figure 9:
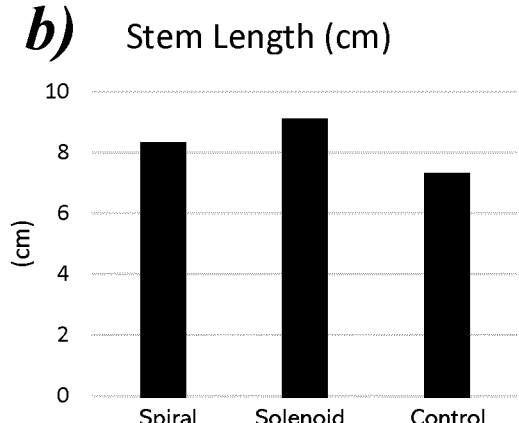
Figure 9:
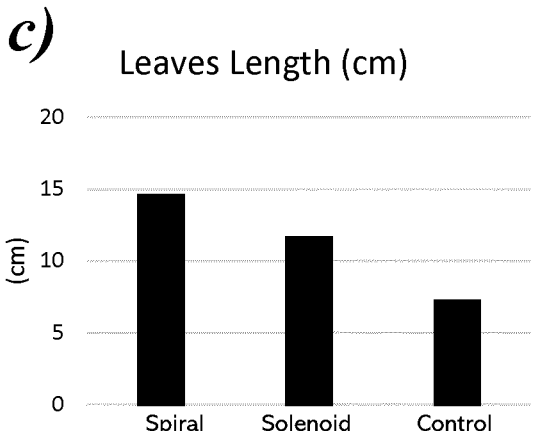
Figure 9:
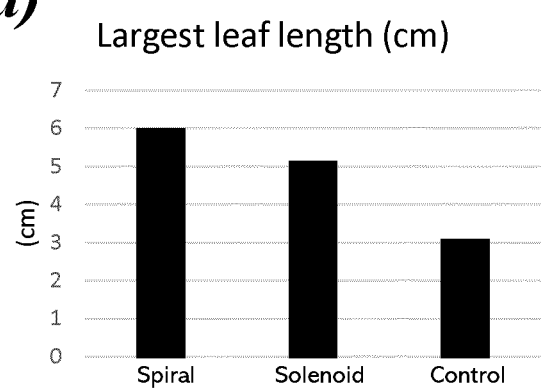

FIGS. 9 *a-d* show data from plants subjected to a treatment according to the proposed technology (marked spiral and solenoid) compared with plants not subjected to the proposed technology (marked control). FIG. 9*a* shows the stem thickness in cm for plants treated using a spiral, for plants treated using a solenoid, and for a control group (i.e. no magnetic field). FIG. 9*b* shows the stem length in cm for plants treated using a spiral, for plants treated using a solenoid, and for a control group (i.e. no magnetic field). FIG. 9*c* shows the leave length in cm for plants treated using a spiral, for plants treated using a solenoid, and for a control group (i.e. no magnetic field). FIG. 9*d* shows the largest leave length in cm for plants treated using a spiral, for plants treated using a solenoid, and for a control group (i.e. no magnetic field).

Figure 10:
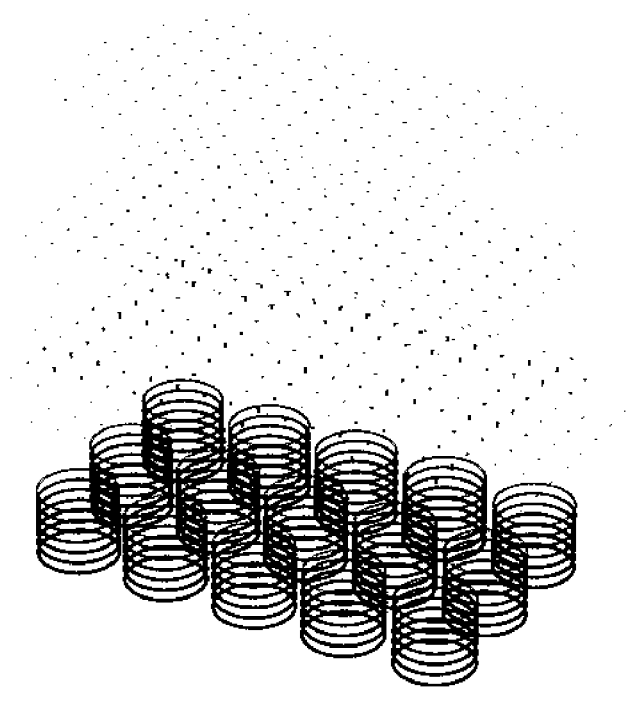
FIG. 10 is a schematic illustration of an experimental set-up.

FIG. 10 is a schematic illustration of an experimental set-up. FIG. 10 shows how 15 coils connected in series may be positioned according to the set-up. Each of the coils has seven turns. The plant cultivation assemblies comprising the coils are placed 2 cm apart.

Figure 11:
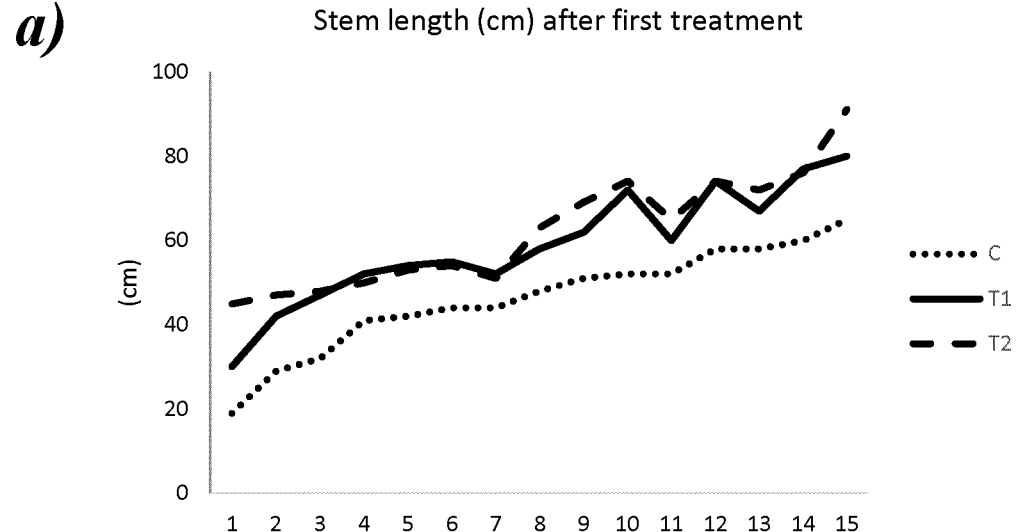
FIGS. 11 *a* and *b* are graphs from an example of the proposed technology.
Figure 11:
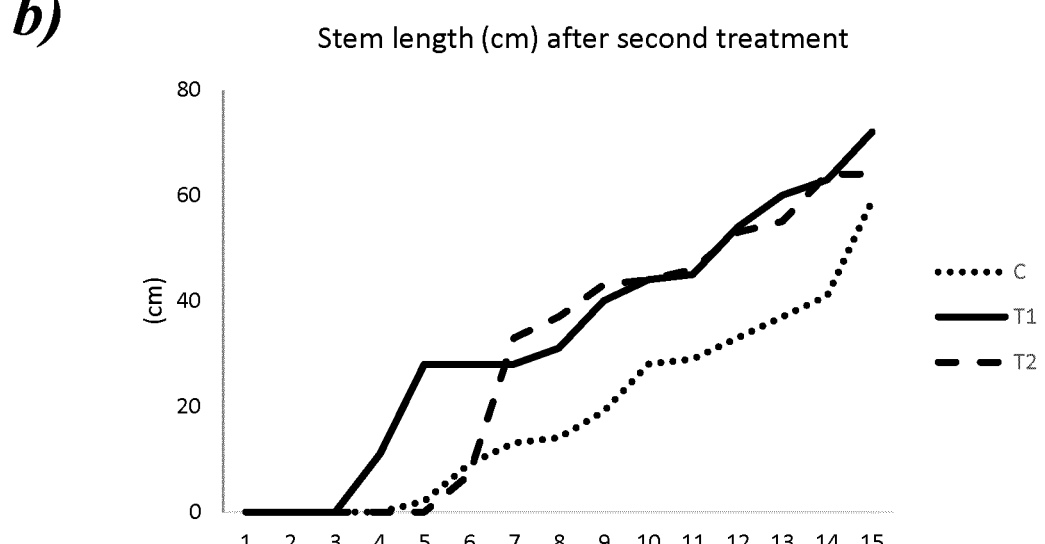
Figure 12A:
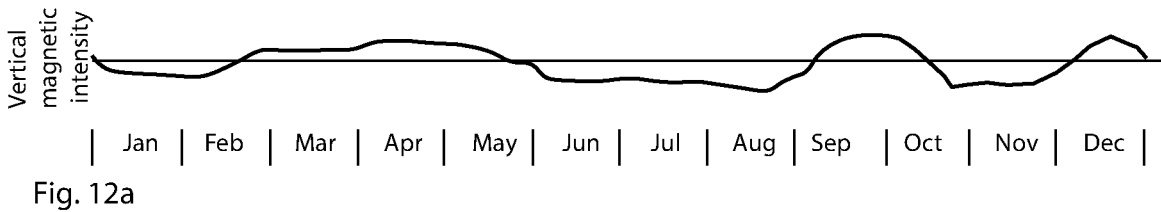
FIGS. 12 *a-e* illustrate one embodiment of the second aspect of the technology.
Figure 12B:
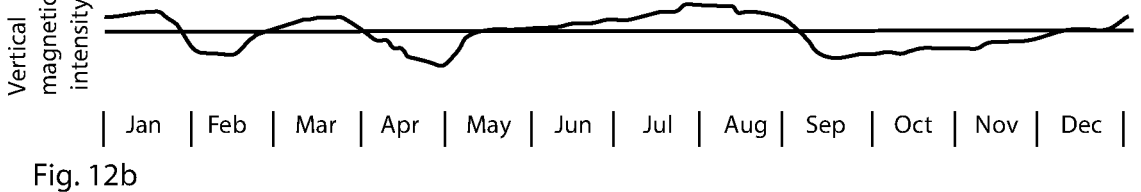
Figure 12C:
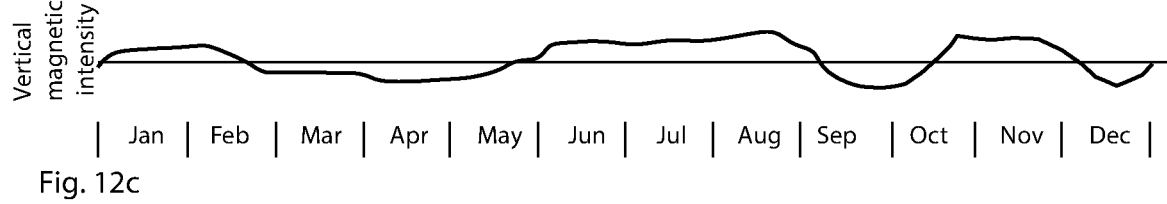
Figure 12D:
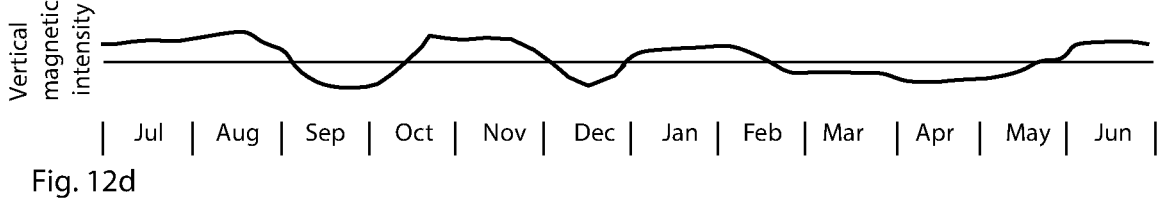
Figure 12E:
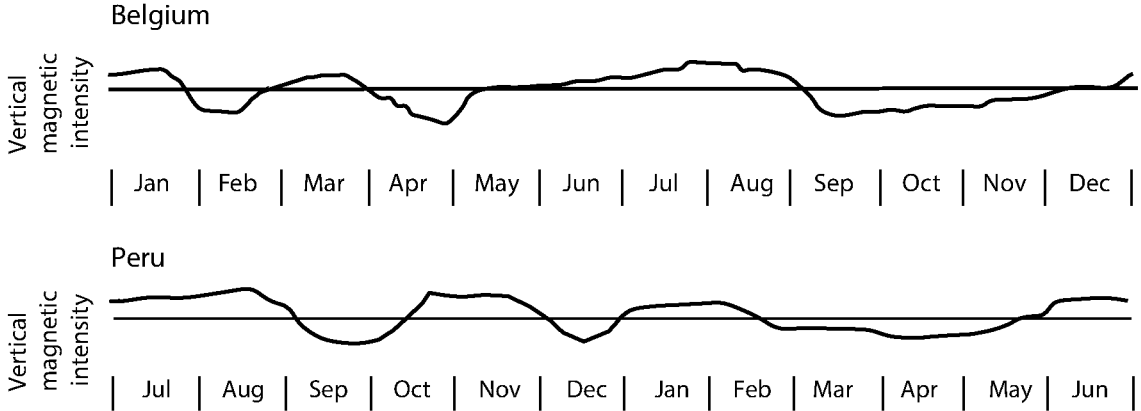

FIGS. 11 *a-b* show data from plants subjected to a treatment according to the proposed technology (T1 representing the setup with a coil and T2 representing the setup with a solenoid) compared with a control group (C). FIG. 11*a* shows the increase in stem length in cm per day after a first treatment. FIG. 11*b* shows the increase in stem length in cm per day after a second treatment.

FIGS. 12 *a-e* illustrate one embodiment of the second aspect of the proposed technology. FIGS. 12 *a-e* show how the steps of the method may be performed. According to the embodiment, determining, or obtaining, a compensating magnetic field is based on data obtained from a database. The data is provided by a geomagnetic observatory. As described above, the changes in the inclination value and intensity of a geographic location repeat according to approximately the same pattern every year. The obtained data provides for calculation of the difference between the target magnetic field and the in-situ magnetic field. According to the embodiment, the mean changes of the magnitude along a certain period in vertical direction are determined, or obtained. In this embodiment, the period is one year.

In this embodiment, the pattern suitable for cultivating a plant is investigated in view of the geographical origin of the plant. In other words, the pattern suitable for the plant is based on the pattern present at the geographical origin of the plant. Therefore, the pattern used is a pattern for one year obtained by the geomagnetic observatory closest to the geographical origin of the plant. In this embodiment, the above-mentioned intermagnet website is used for obtaining the data. The corresponding step of data obtaining is performed for an in-situ magnetic field.

Thereafter, a mean value for each of the data is calculated for a period of time and matched with the plant lifecycles during seasons. In FIGS. 12 *a-e*, the plot is representing the intensity of the downward field. It is understood that the downward field is a vertical field. The plots of FIGS. 12 *a-e* illustrate that the mean magnitude of the downward field is changing during seasons.

The plots of FIGS. 12 *a-e* show vertical magnetic intensity. The person skilled in the art recognizes that the corresponding method can also be used for calculating, or determining, or obtaining, the horizontal magnetic intensity or for calculating, or determining, an inclination value.

FIGS. 12 *a-e* show one embodiment of the proposed technology. The embodiment is directed toward investigation of the lifecycle of a plant, specifically potato, and considerations regarding cultivation thereof in Belgium. It is understood that cultivation according to this embodiment encompasses planting the potato in the soil. Here, the potato species is *Papa Amarilla*, which is an Andean variety of *Solanum tuberosum*. The potato species is native to Peru. Therefore, data from HUA observatory in Peru are used for determining, or obtaining, the target magnetic field. As the cultivation place is Belgium, the data from the MAB observatory in Belgium is used for determining, or obtaining, the in-situ magnetic field. As described above, the compensating magnetic field is based on the difference between the target magnetic field and the in-situ magnetic field.

FIG. 12 *a* shows mean values of the data for the vertical magnetic field from the HUA observatory in Peru in 2018.

FIG. 12 *b* shows mean values of the data for the vertical magnetic field the from the MAB observatory in Belgium in 2018.

FIG. 12 *c* shows reversed mean values of the data for the vertical geomagnetic field from the HUA observatory in Peru in 2018. The vertical fields in the northern and southern hemisphere are in the opposite directions. The vertical field is upwards in the southern hemisphere and downwards in the northern hemisphere. Therefore, the plot of FIG. 12 *a* is reversed vertically and forms the plot of FIG. 12 *c*. By reversing the plot, the fluctuations based on downward vertical field are presented as in the northern hemisphere.

FIG. 12 *d* shows reversed and time-shifted mean values of the data for the Vertical geomagnetic field from the HUA observatory in Peru in the year 2018. The seasons and the beginning of the lifecycles are starting in opposite months in the southern and northern hemisphere. Therefore, the plot of FIG. 12 *c* is cut in July and shifted to match with January in Belgium. The plot portion corresponding to January-Juny is shifted accordingly. Accordingly, the cut and shifted plot of FIG. 12 *c* forms FIG. 12 *d*.

FIG. 12 *e* shows the combination of mean values of the data from the MAB observatory in Belgium for 2018 and reversed and time-shifted mean values of the data for the vertical geomagnetic from the HUA observatory in Peru in the same year.

The planting season in Peru is September, which in the pattern of FIG. 12 *e* matches the same time in April that the potatoes are planted in Belgium.

As seen in FIG. 12 *e*, the downward field is dropping for the Belgium in April and Peru in September. This means reduction in the downward filed and equals to increasing upward field. After planting, an increase in the downward fields is observable for both Belgium and Peru. The increase continues until the harvest time, which is September in Belgium and March in Peru.

The compensating magnetic field based on the difference between the target magnetic field and the in-situ magnetic field is determined, or obtained, or calculated. The plant is then subjected to the compensating magnetic field. Thereby, the plant is subjected to the pattern fluctuations according to its geographical origin. Thus, the plant hormone generation is manipulated by forcing the pattern fluctuations.

As illustrated by the two graphs of FIG. 12 *e*, the changes in the magnetic field follow a pattern although the patterns are slightly different for the two hemispheres. It is possible to identify the seasonal trigger periods that activate the hormones in the plants. By extending or shortening these periods, it is possible to manipulate the lifecycle of the plants. The applied compensating field provides for manipulation of the lifecycle of the plants.

According to the embodiment as described above, the mean value of the fluctuations is determined along a certain period. However, it is understood that it is possible to use the actual variations without determining the mean value.

It has been illustrated above how the proposed technology may be used taking into account the seasonal based variations in the magnetic field. It is understood that the variations in the magnetic field may be considered for another period, such as one day, or 24 hours period.

The geomagnetic field has a regular variation with a fundamental period of 24 hours. The inclination value may diverge by, for example, less than one degree from the mean value based on the 24 hours interval. The intensity of the magnetic field may diverge by, for example, up 30 nT from the mean value based on the 24 hours interval. As mentioned above, the recorded magnetic data for all day/night may be obtained from, for example, the intermagnet website. Based on the data, a compensating magnetic field may be obtained for the period of 24 hours. The plant may then be subjected to the compensating magnetic field.

According to another aspect of the proposed technology, there is provided a method for controlling or adjusting hormone levels in a plant comprising subjecting the plant to a magnetic field. This method may comprise any of the features of the above-described method. This is based on the realisation that the above-described method may impact the hormone levels of plants.

DETAILED DESCRIPTION

It shall also be pointed out that all information about/concerning terms such as above, under, upper, lower, etc., shall be interpreted/read as having the assembly oriented according to the figures, having the drawings oriented such that the references can be properly read. Thus, such terms only indicate mutual relations in the shown embodiments, which relations may be changed if the proposed equipment is provided with another structure/design.

In a first embodiment a plant cultivation assembly comprising a growth medium support 101, a growth position 108 in the growth medium support 101, and a magnet 103. Such a plant cultivation assembly 100 is for example illustrated in FIG. 1. The growth medium support 101 is configured to be supported on a horizontal surface 102. The growth medium support 101 comprises a lower half 101*a* or lower part, and an upper half 101*b* or upper part. A growth position 108 is arranged in the upper half 101*b* and at the center of the growth medium support 101. The growth position 108 is arranged in the upper third or upper quarter of the growth medium support 101.

The growth medium is arranged to define a growth position 101, at which the plant is positioned.

The plant cultivation assembly 100 further comprises a magnet 103. The magnet 103 is configured to generate a magnetic field at the growth position 108 in the growth medium support 101 that is inclined with respect to a horizontal plane 102. By generating or applying a magnetic field that is inclined with respect to a horizontal plane 102 at the growth position 108, or at the plant 107 arranged at the growth position 108, the development of the plant 107 is be influenced. Hence, the growth rate of the plant 107 is controlled so that the plant 107 grows faster. In other embodiments, plants 107 can for example respond to the applied magnetic field by growing slower, or even stop developing. The response depends on the intensity and the direction, or inclination, of the applied magnetic field. Hence, the plant cultivation assembly 100 advantageously controls the development of the plant, both in terms of intensity and in terms of direction.

Depending on the type of plant, the intensity and direction of the magnetic field is determined, or obtained, depending on the wanted response and on the stage the plant 107 are in, i.e. germination, flowering, dormancy, etc. as well as on the origin of the plant 107.

In one embodiment of plant cultivation assembly 100 the magnet 102 is an electromagnet. The electromagnet is connected a power supply, as illustrated in FIG. 5. The plant cultivation assembly 100 further has a control unit 105 operationally connected to the electromagnet of the plant cultivation assembly 100. The control unit 105 controls the strength of the current supplied to the electromagnet. The compensating magnetic field that is generated combine with the in-situ magnetic field at the plant cultivation assembly 100 and result in a target magnetic field. This way, the control unit 105 is configured to control the intensity and/or direction, or inclination, of the target magnetic field. This has the advantage that a magnetic field generated by the electromagnet can be controlled and varied depending on the type of plant 107, that wanted response from the plant 107, the development stage of the plant 107, and/or the origin of the plant 107.

In one embodiment of the plant cultivation assembly 100 the electromagnet is in the form of a coil that is slanted in relation to the horizontal surface 102. The slanted magnet/coil 103 has the effect that the compensating magnetic field at the growth position 108 is inclined with respect to the horizontal plane 102. An inclined magnetic field offers the advantage that it can replicate all features (in particular intensity and inclination, it could possibly replicate declination as well) of the target magnetic field.

In one embodiment of the plant cultivation assembly 100 the magnet 103 is an electromagnet in the form of a solenoid. The solenoid partly surrounds the growth medium support 101 as illustrated in FIG. 1. The growth medium support 101 is positioned within the helix defined by the solenoid. The slanted solenoid has the effect that the generated compensating magnetic field is inclined with respect to a horizontal plane 102. In this embodiment the electric current supplied by the control unit 105 is held constant and the generated compensating magnetic field is static. In other embodiments the plant 108 is exchanged for another type of plant 108 and the current is changed to provide a compensating magnetic field that is static but with a different intensity.

In one embodiment of the plant cultivation assembly 100, the assembly 100 further has a mat 104. Such an embodiment is schematically illustrated in FIG. 4. The mat 104 has one magnet 103. The magnet 103 is an electromagnet formed as a coil of copper wire. The mat 104 is flexible and waterproof. The electromagnet could also be formed from other metals, or graphite.

The Earth's magnetic field has different intensity and inclination, or direction, values at different geographical locations, or sites. By subjecting the plant for the same, or essentially the same, magnetic field as the magnetic field at the plants site of origin the growth cycle of the plant can be altered or affected. Therefore, in an embodiment of a method of cultivating a plant, the following steps are performed:

determining, or measuring, or obtaining, a target magnetic field having a target inclination value and a target intensity value;

determining, or measuring, or obtaining, an in-situ magnetic field at the specific geographical location having an inclination value and a target intensity value;

determining, or measuring, or obtaining, a compensating magnetic field based on the difference between the target magnetic field and the in-situ magnetic field; and subjecting the plant (107) to the compensating magnetic field.

In one embodiment of the method of the proposed technology the plant 107 is a seed, and the specific development stage germination. One advantage with applying a compensating magnetic field during germination is that the plant can grow bigger and faster.

In one embodiment of the method the plant is a sprout, and the specific development stage is seedling. One advantage with applying a compensating magnetic field during seedling is that the plant can obtain more leaves and grow bigger.

In one embodiment of the method the plant 107 is a bud, and the specific development stage is bud stage. The development stage following bud stage is flowering, by applying a compensating magnetic field during bud stage the time period for the bud to enter the flowering stage can be reduced.

In one embodiment of the method of the proposed technology the plant 107 is a bulb, and the specific development stage is vegetative stage. One advantage with applying a compensating magnetic field during the vegetative stage of a bulb, is that the vegetative stage can be prolonged and that the plant can remain in the bulb stage for a longer time period, i.e. prolong the time period until flowering. In one embodiment of the method of the proposed technology the compensating magnetic field is applied during germination, seedling, and bud stage. It may also be applied during other/more/fewer development stages such as flowering, ripening, and vegetating. One advantage with applying a compensating magnetic field during several, i.e. at least two, development stages the speed of the growth cycle can be enhanced. It is an advantage with the proposed technology that the lifecycle of a plant 107 can be reduced or extended, and controlled. For example, a plant 107 that has been subjected for the method of the proposed technology can flower twice a year instead of once.

In one specific embodiment of the method, the plant is an amaryllis. Amaryllis is an ornamental flower native to South Africa which mainly propagates from the small bulbs that develops besides the main bulb that generates flower stems. Amaryllis is an annual plant that flowers once a year, naturally in western cape around the time in October. In the northern hemisphere it naturally blooms in March to April.

To make the flower bulbs ready for generating flower stems and bloom, the plant naturally goes through an annual cycle. The bulb gets ready and saves energy during the winter, and it starts generating one or two flower stems and starts to bloom in the spring. The plant generates leaves after the blooming and by the end of summer and beginning of winter season it loses its leaves and goes back to dormancy.

Today this growing cycle is controlled in commercial farms to maintain the growing season, accelerate the blooming, and to preserve the bulbs in order to delay the blooming season. This is generally controlled by the use of climate rooms wherein the temperature and/or humidity are controlled. One advantage with a method according to the proposed technology is that it can be used without or in combination with traditional climate chamber treatments.

In the embodiment a vertical, downward compensating magnetic field is applied when the flower bulbs are dry and saving energy for the next season. This may accelerate the growth once the flower bulb is planted and receives water. The duration and intensity of the treatment depends on the type of flower. However, typically it varies between a few days and up to 10 weeks. This treatment can be seen as a pre-treatment and followed by a secondary treatment during the flowering period.

In the specific embodiment, a vertical, downward compensating magnetic field is applied also when flower the bulbs are flowering. This may allow for stem elongation and/or trigger leaf development. This can for example be used for young flower bulbs that require to go through 2-3 years of leaf development until they can develop flower stems. With a treatment according to the proposed technology such process can be speeded up.

In the specific embodiment, an upward compensating magnetic field is applied to a plant after flowering. This can accelerate the leaf ageing and getting the plants ready to go back into dormancy stage. In commercial farms this process is normally done by applying high temperature for 10-15 days.

Proof of Concept

The present examples are provided for illustrative purposes only, and are not to be construed as limiting the scope of the present invention as defined by the appended claims.

Example 1: Tomatillo

Two different sets of Tomatillo plants grown from seed germination to fruiting stage were used for the experiment.

First test was a set of three types of tomatillo seeds in two different group of samples. The sample seeds were planted separately, each one in square plastic propagation pots with the dimensions 4×4×6 cm. All pots were placed in a 21 cm diameter plastic pot. In total 18 small square pots, and two large round pots.

Nine small square pots, including 1 tomatillo seed in each. In total 9 seeds (3 seeds type SIQUIROS, 3 seeds type DALI, 3 seeds type TOMAYO) all 9 pots were placed in the larger pot, and kept as the control group. FIG. 6a-d shows schematic illustrations of the experimental set-up. FIG. 6a shows the set-up for 2 group of seed pots. FIG. 6b shows the setting for the control group. FIGS. 6c and d shows the setting for the test post connected to the current generator. The same setting was made for test group. Both groups in the round pots were place on a square mat. In one of the mats there was a spiral coil placed in the center of the mat. The test group was placed on the mat with the spiral coil.

The tomatillo test was performed using three different types of seed: Siquiros, Dali, and Tomayo.

1. First Test

For the first test the test subjects (seeds) were divided into two groups: control and treatment. Each group had 3 seeds of each seed type. Both groups used the same type of pots and were placed on a mat. The mat for the treatment group comprised an electromagnet, hence the treatment group were subjected to a magnetic field. No magnetic field were applied to the control group. See table 1 for summary.

TABLE 1

| Summary first test | | | |
| --- | --- | --- | --- |
| Number of seeds | 18 | | |
| Seed types | 3 | | |
| Control | 3-3-3 | Regular pot on flat mat | No magnetic field |
| Treatment | 3-3-3 | Regular pot on flat mat No magnetic field | 30 mA downward direction magnetic field |

Comparison of Germination Rate

The test group has had a 33% higher germination rate as compared to the control group. A summary can be seen in Table 2. An illustrative example of the difference in size between the treatment (1) and the control (2) can be seen in FIGS. 7 and 8. As can be seen in FIGS. 7 and 8, the leaves, stem and root of the treatment samples are larger than the corresponding for the control samples.

TABLE 2

| Summary results of first test | | |
| --- | --- | --- |
| Seed types | Germinated seeds | Germination rate |
| Control | 5 | 56% |
| Treatment | 8 | 89% |
| Difference | | 33% |

2. Second Test

The second experiment on tomatillo type TOMAYO was tested with an additional type of treatment:

Three seeds Treatment 1: Solenoid upward field 7.5 µT (24 cm diameter pot, 40 turns of wire, solenoid length 20 cm, 30 mA current)

Five seeds Treatment 2: Flat spiral coil

Three seeds Control (no magnetic field)

The test result comparison between the two treatment and control groups are shown in the tables 3-6 below and in FIGS. 9 a-d.

TABLE 3

| Summary results of first test (flat spiral coil) | | | |
| --- | --- | --- | --- |
| Stem Thickness (mm) | Length (cm) | Leaves (cm) | Biggest leaf (cm) |
| 2.45 | 7 | 10 | 4.2 |
| 3.65 | 8 | 19 | 7.5 |
| 2.82 | 10 | 15 | 6.3 |

TABLE 4

| Summary results of first test (control group) | | | |
| --- | --- | --- | --- |
| Stem Thickness (mm) | Length (cm) | Leaves (cm) | Biggest leaf (cm) |
| 1.95 | 8.0 | 7.5 | 3.5 |
| 2.58 | 8.5 | 8.5 | 3.3 |
| 1.65 | 5.5 | 6.0 | 2.5 |

TABLE 5

| Summary results of first test (solenoid) | | | |
| --- | --- | --- | --- |
| Stem Thickness (mm) | Length (cm) | Leaves (cm) | Biggest leaf (cm) |
| 2.09 | 8.5 | 9.5 | 4.5 |
| 3.35 | 9.0 | 10.0 | 5.0 |
| 3.9 | 10.0 | 15.0 | 6.1 |
| 3.05 | 9.0 | 12.5 | 5.0 |

TABLE 6

| Summary results of first test (average) | | | | |
| --- | --- | --- | --- | --- |
| Type | Stem Thickness (mm) | Length (cm) | Leaves (cm) | Biggest leaf (cm) |
| Spiral | 2.97 | 8.33 | 14.67 | 6.0 |
| Control | 3.10 | 9.13 | 11.75 | 5.15 |
| Solenoid | 2.06 | 7.33 | 7.33 | 3.1 |

According to this test the speed of germination and seedling stem elongation was higher for the seeds with the basic solenoid with upward magnetic field and they developed stronger stems. The plants with the spiral having a downward magnetic field developed larger leaves.

The average stem thickness increased 20% compared with the control group in the second test, and a 12% increase in stem elongation as well as a 7% increase in the size of the leaves.

The germination rate, speed and size of the plants were all increased in both treatment groups in comparison with the respective control group.

Apart from quality of the plants, the size of the fruits and the yield was significantly higher in the treated plants, i.e. the ones treated with an inclined magnetic field.

Example 2: Amaryllis

45 Amaryllis bulbs in three groups of 15 bulbs (Treatment 1, Treatment2, Control)

The bulbs are all at the end of dormancy period, and ready to grow stems, all facing up.

The bulbs of each group were planted in a 40×60 cm tray, in a plant cultivation assembly with an 8 cm diameter. The plant cultivation assemblies were placed 2 cm apart, see schematic drawing in FIG. 10. The control group was placed on a normal plastic tray. The treatment groups were treated in two different ways, first time during the dormancy season, and a second time during flowering. The treatments were run in parallel.

Treatment 1: plastic tray including 15 coils connected in series, each coil with seven turns. 40 mA current, vertical field specification: Downward, 0.8 µT at the root level.

Treatment 2: plastic tray including 15 coils connected in series, each coil with seven turns. 40 mA current, vertical field specification: Upward, 0.8 µT at the root level.

The current was applied by a 12V DC current generator. The magnetic field were measured 2 and 10 cm above the top layer.

The results are shown in the Tables below and in FIG. 11 *a* and *b*. FIG. 11*a* shows the increase in stem length after the first treatment. FIG. 11*b* shows the increase in stem length after Treatment 2. The respective stem lengths were measured day 30 after start of watering.

TABLE 7

Average first stem length (cm).

| | Control | Treatment 1 | Treatment 2 |
|---|---|---|---|
| 1 | 19 | 30 | 45 |
| 2 | 29 | 42 | 47 |
| 3 | 32 | 47 | 48 |
| 4 | 41 | 52 | 50 |
| 5 | 42 | 54 | 53 |
| 6 | 44 | 55 | 54 |
| 7 | 44 | 52 | 51 |
| 8 | 48 | 58 | 63 |
| 9 | 51 | 62 | 69 |
| 10 | 52 | 72 | 74 |
| 11 | 52 | 60 | 65 |
| 12 | 58 | 74 | 74 |
| 13 | 58 | 67 | 72 |
| 14 | 60 | 77 | 76 |
| 15 | 65 | 80 | 91 |

TABLE 8

Average second stem length (cm)

| | Control | Treatment 1 | Treatment 2 |
|---|---|---|---|
| 1 | 0 | 0 | 0 |
| 2 | 0 | 0 | 0 |
| 3 | 0 | 0 | 0 |
| 4 | 0 | 11 | 0 |
| 5 | 2 | 28 | 0 |
| 6 | 9 | 28 | 7 |
| 7 | 13 | 28 | 33 |
| 8 | 14 | 31 | 37 |
| 9 | 19 | 40 | 43 |
| 10 | 28 | 44 | 44 |
| 11 | 29 | 45 | 46 |
| 12 | 33 | 54 | 53 |
| 13 | 37 | 60 | 55 |
| 14 | 41 | 63 | 64 |
| 15 | 59 | 72 | 64 |

Continuing treatment 1 accelerates the aging of the plant in the cycle and allows the leaves to dry faster and go back to dormancy earlier in the season. (Similar to autumn effect in this specific plant according to the start season of life-cycle). Table 9 shows the number of flowers on the stems after the different treatments.

TABLE 8

Number of fully bloomed flowers

| Treatment | Number of first flowers | Number of second flowers |
|---|---|---|
| Treatment 1 | 12 | 5 |
| Treatment 2 | 15 | 3 |
| Control | 7 | 0 |

The invention claimed is:

1. A method of cultivating a plant at a specific geographical location, the method comprising:

determining, by a processor, a target magnetic field intensity of a target magnetic field at a geographical origin region of the plant, the target magnetic field having a target inclination value, the processor being configured to determine the target magnetic field intensity by one of (a) receiving, from a magnetometer, a target magnetic field intensity measurement that indicates the target magnetic field intensity at the geographical origin region of the plant, and (b) extracting, from a database, target magnetic field intensity data that indicate the target magnetic field intensity at the geographical origin region of the plant;

determining, by the processor, an in-situ magnetic field intensity at the specific geographical location of the plant, the processor being configured to determine the in-situ magnetic field intensity by one of (a) receiving, from a magnetometer, an in-situ magnetic field intensity measurement that indicates the in-situ magnetic field intensity at the specific geographical location of the plant, and (b) extracting, from a database, in-situ magnetic field intensity data that indicate the in-situ magnetic field intensity at the specific geographical location of the plant;

determining, by the processor, a compensating magnetic field having a compensating magnetic field intensity based on the difference between the target magnetic field intensity and the in-situ magnetic field intensity;

generating the compensating magnetic field by an electromagnet communicatively coupled to, and controlled by, the processor, so as to subject the plant to the compensating magnetic field.

2. The method according to claim 1, wherein the plant is in a specific development stage and has a natural growing season, wherein the geographical origin region of the plant has a geomagnetic field with varying seasonal magnetic field intensity values, and wherein determining the target magnetic field intensity includes providing to the processor a seasonal magnetic field intensity value of the geomagnetic field obtained from a geomagnetic observatory, wherein the target magnetic field intensity is based on the specific development stage of the plant, the natural growing season of the plant, and the seasonal magnetic field intensity value of the geomagnetic field obtained from the geomagnetic observatory.

3. The method according to claim 2, wherein the plant is a seed, and the specific development stage is germination.

4. The method according to 3, wherein the plant is subjected to the compensating magnetic field during germination.

5. The method according to claim 2, wherein the plant is a sprout, and the specific development stage is a seedling stage.

6. The method according to claim 5, wherein the plant is subjected to the compensating magnetic field during the seedling stage.

7. The method according to claim 2, wherein the plant is a bud, and the specific development stage is a bud stage.

8. The method according to claim 7, wherein the plant is subjected to the compensating magnetic field during the bud stage.

9. The method according to claim 2, wherein the plant is a bulb, and the development stage is a vegetative stage.

10. The method according to claim 1, wherein the compensating magnetic field is static.

\* \* \* \* \*